United States Patent
Hartmann et al.

(10) Patent No.: US 10,890,509 B2
(45) Date of Patent: Jan. 12, 2021

(54) HOLDING DEVICE FOR A WIND TUNNEL BALANCE AND TEST METHOD

(71) Applicant: MAHA-AIP GmbH & Co. KG, Haldenwang (DE)

(72) Inventors: Christian Hartmann, Altusried (DE); Anton Knestel, Hopferbach (DE)

(73) Assignee: MAHA-AIP GMBH & CO. KG, Haldenwang (DE)

(*) Notice: Subject to any disclaimer, the term of this patent is extended or adjusted under 35 U.S.C. 154(b) by 535 days.

(21) Appl. No.: 15/555,948

(22) PCT Filed: Mar. 4, 2016

(86) PCT No.: PCT/EP2016/054609
§ 371 (c)(1),
(2) Date: Sep. 5, 2017

(87) PCT Pub. No.: WO2016/139326
PCT Pub. Date: Sep. 9, 2016

(65) Prior Publication Data
US 2018/0045601 A1    Feb. 15, 2018

(30) Foreign Application Priority Data
Mar. 5, 2015  (DE) .......................... 102015204019

(51) Int. Cl.
*G01M 9/06* (2006.01)
*G01M 17/04* (2006.01)
(Continued)

(52) U.S. Cl.
CPC .......... *G01M 9/062* (2013.01); *G01B 5/0004* (2013.01); *G01M 9/02* (2013.01); *G01M 9/04* (2013.01);
(Continued)

(58) Field of Classification Search
CPC .... G01M 9/062; G01M 9/04; G01M 17/0074; G01M 17/0072; G01M 9/02; G01M 17/045; G01B 5/0004; G01L 5/28
See application file for complete search history.

(56) References Cited

U.S. PATENT DOCUMENTS 6,485,001 B1 * 11/2002 Mallery ................. B66C 23/48
254/124
2009/0217775 A1    9/2009 Litz et al.
(Continued)

FOREIGN PATENT DOCUMENTS

DE    112009000493    7/2011
DE    102011085640    5/2013
(Continued)

OTHER PUBLICATIONS

International Search Report for PCT Application No. PCT/EP2016/054609 dated May 20, 2016, 6 pages.

*Primary Examiner* — Daniel S Larkin
*Assistant Examiner* — Anthony W Megna Fuentes
(74) *Attorney, Agent, or Firm* — Womble Bond Dickinson (US) LLP

(57) ABSTRACT

The device described herein and the associated method relate, in particular, to a holding device for a wind tunnel test stand 1, in particular for a wind tunnel balance. The device may comprise a holding base 5a, 6a, which may be arranged outside of a conveyor belt 3 of the wind tunnel test stand 1, and a support element 7 having at least two ends 7a, 7b. Via a connection element 13, one end of the support element 7 may be connected to a wheel 22 of a test object 4. Furthermore, a support device 8 may be provided, which may be connected to the support element 7 in such a way that a change in a rotational orientation of the support element 7 can cause a lifting or lowering movement of the support device 8.

15 Claims, 5 Drawing Sheets

Figure 1:
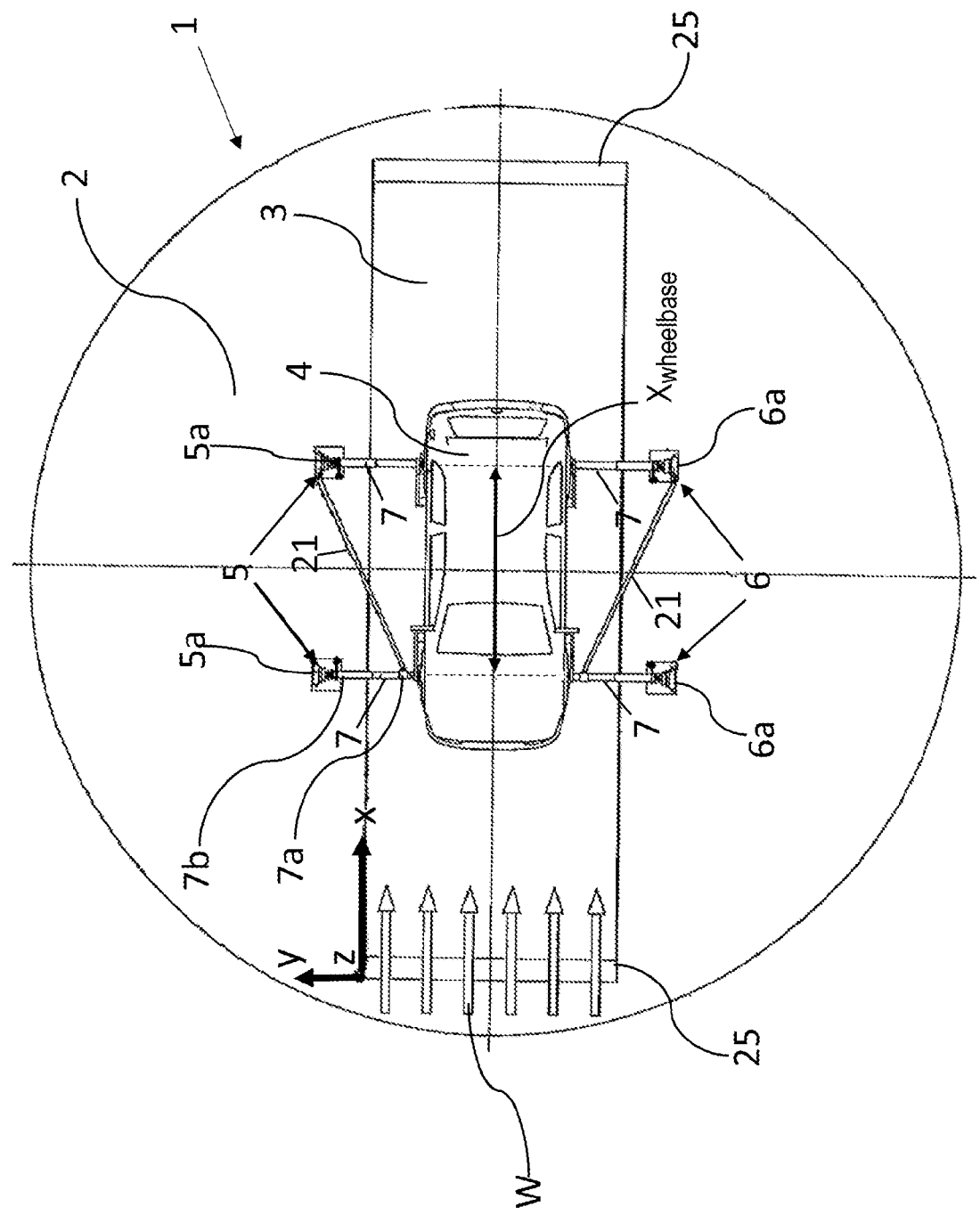

(51) Int. Cl.
  *G01M 9/02* (2006.01)
  *G01B 5/00* (2006.01)
  *G01M 17/007* (2006.01)
  *G01M 9/04* (2006.01)

(52) U.S. Cl.
  CPC .... *G01M 17/0072* (2013.01); *G01M 17/0074* (2013.01); *G01M 17/045* (2013.01)

(56) References Cited

U.S. PATENT DOCUMENTS

| | | |
|---|---|---|
| 2011/0277560 A1 | 11/2011 | Barnett et al. |
| 2014/0208839 A1 | 7/2014 | White |
| 2015/0000392 A1 | 1/2015 | Knestel et al. |

FOREIGN PATENT DOCUMENTS

| | | |
|---|---|---|
| EP | 1983322 | 10/2008 |
| JP | 2006-170639 | 6/2006 |
| WO | WO-2010/117793 | 10/2010 |

\* cited by examiner

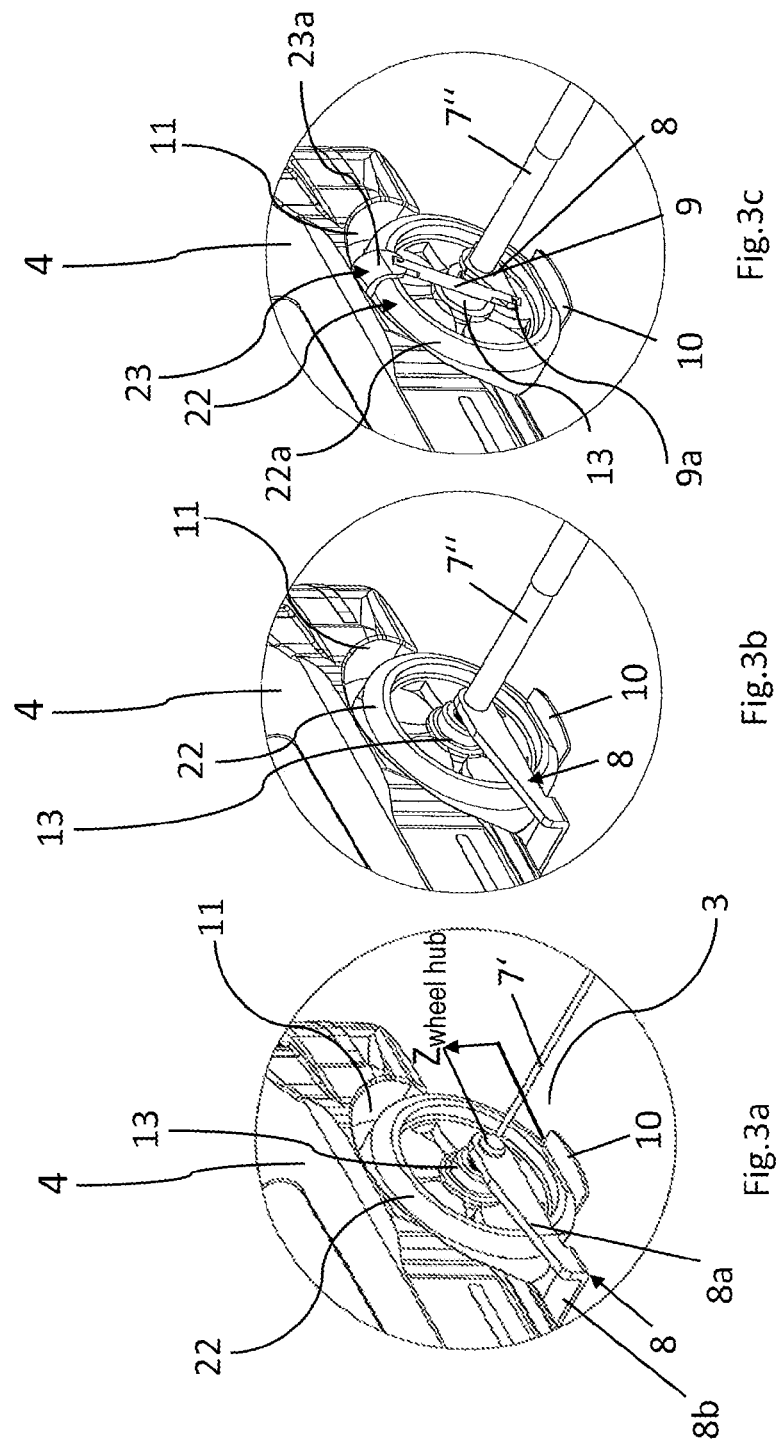

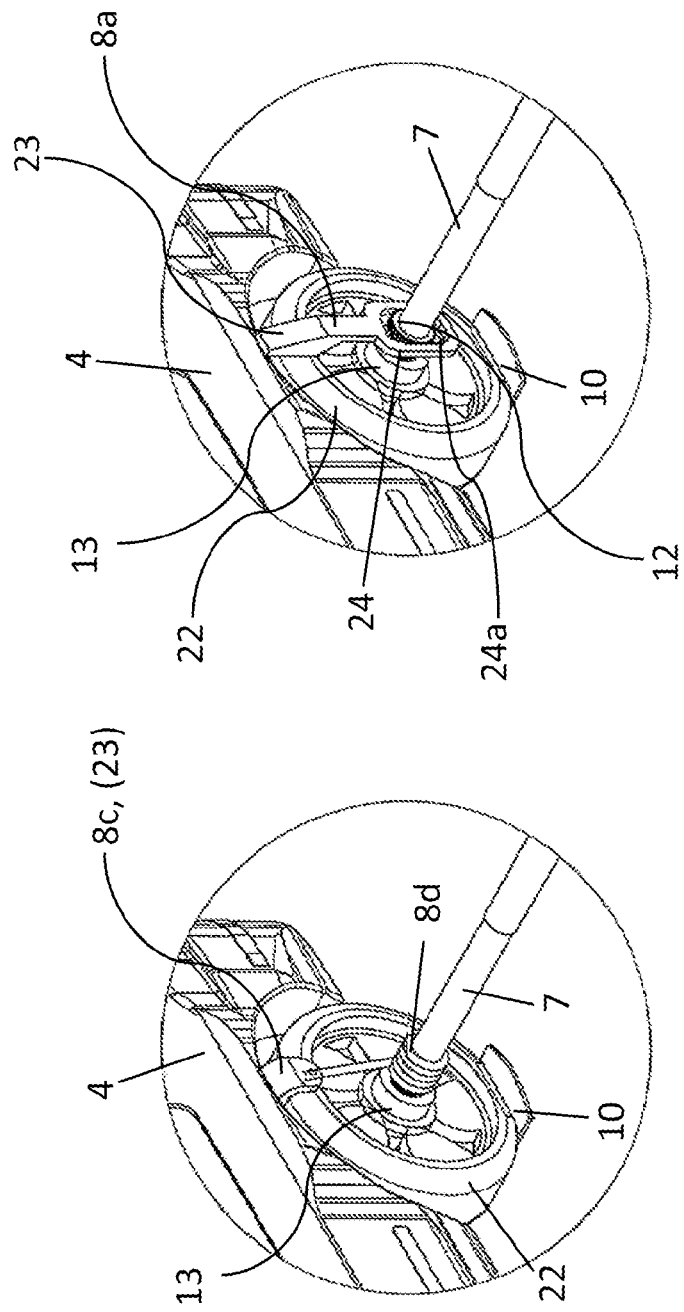

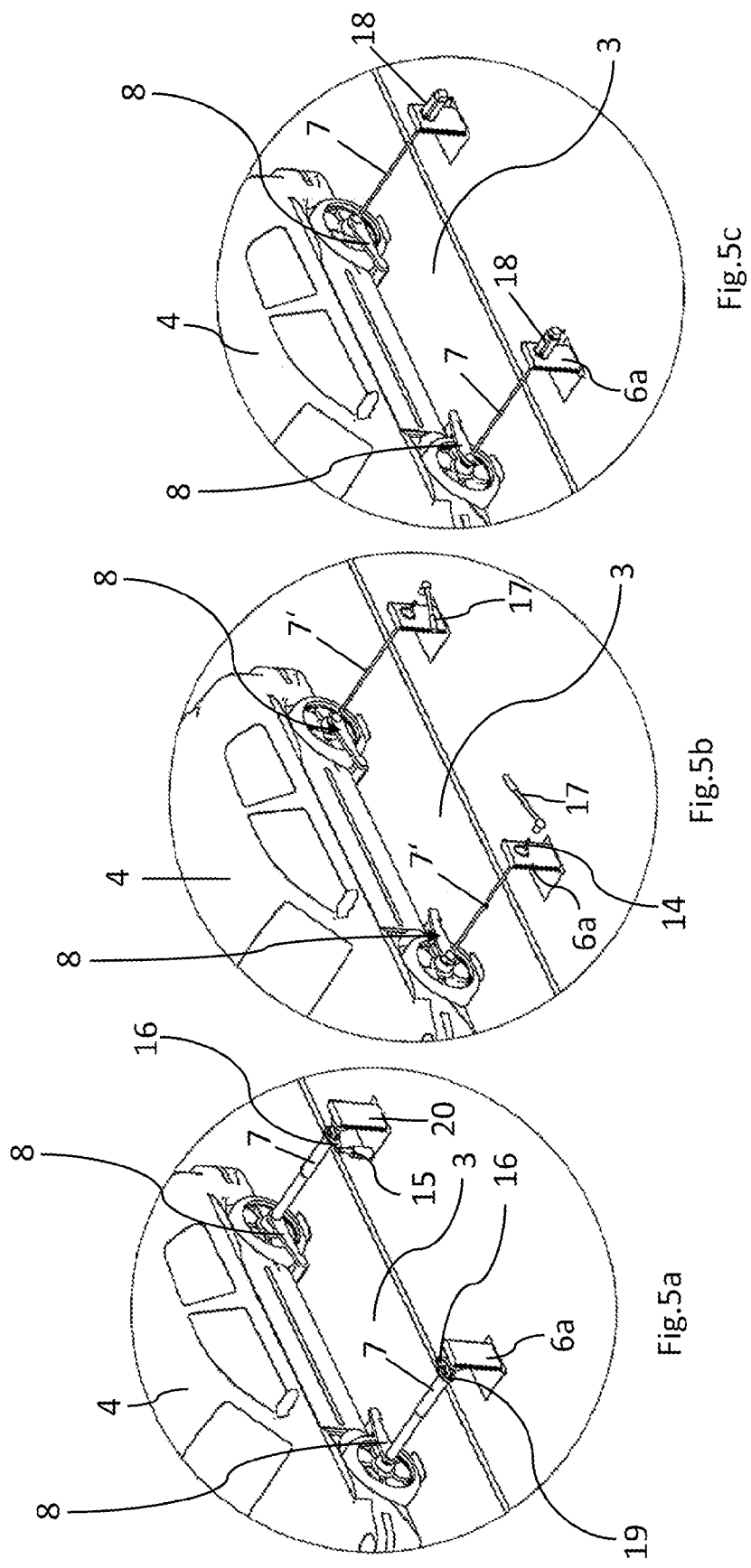

HOLDING DEVICE FOR A WIND TUNNEL BALANCE AND TEST METHOD

This application is the U.S. National Stage entry under 35 U.S.C. § 371 of international application PCT/EP2016/054609, filed 4 Mar. 2016, which in turn claims priority to German patent application DE 10 2015 204 019.4, filed 5 Mar. 2015.

The holding device for a wind tunnel balance and the associated method described herein make it possible to securely fasten cars on a wind tunnel balance and to hold them in position. It should be emphasized that the holding device makes it possible to set or change the underbody clearance of the vehicle, without this resulting in errors in measurements. The test method described herein further allows for an elimination of measurement influences not desired for testing. Thus, both the holding device and the test method described herein make it possible to test and examine vehicles in a wind tunnel test stand with higher accuracy.

During the development of motor vehicles, such as passenger cars or racing cars, these cars are usually tested in wind tunnels with regards to their aerodynamic pcablerties. For the measurement of forces acting on the vehicle in these aerodynamic tests, wind tunnel balances are used.

Known wind-tunnel balances have, for example, a different number of belt units, and accordingly one-belt, three-belt, and five-belt test stands are distinguished. The coordinate system of the test stands is usually selected such that the X-axis points in the direction of travel of a conveyor belt of the test stand or wind tunnel balance. The Y-axis is transverse to the conveyor belt. The Z-axis points from the surface of an upper run of the conveyor belt away from the conveyor belt. This coordinate system is also used in the figures of the present invention described below.

The test stands usually have a belt unit with a continuous conveyor belt which rotates on two rollers or drums. For aerodynamic tests, the motor vehicle is positioned with its wheels on the one or more conveyor belts and fixed with respect to the conveyor belt(s) by means of a holding device. Known holding devices are attached laterally of the conveyor belt and have arms that reach from the lateral attachment over the conveyor belt(s) to hold the wheels of the motor vehicle on the conveyor belt at a predetermined position. Other holding devices further have arms that engage the body of the vehicle. In addition, mounts which are arranged below the upper run of the conveyor belt between the rollers may sense a weight of the motor vehicle. The mounts may include, for example, weighing pads or the like and may each be arranged below a wheel of the motor vehicle such that Z-forces may be sensed through the belt. (In this context, this is referred to as a through-belt measurement)

The above-mentioned known holding devices allow for an adjustment of the underbody clearance of the motor vehicle with respect to the surface of the conveyor belt, on which the motor vehicle is disposed. For this purpose, the position of the arms of the holding devices can be changed in z-direction. For example, the lateral attachments may include a linearly extendable actuator for this purpose. A change in the position of the arms in z-direction causes a lifting or lowering movement of the vehicle and thus, for example, leads to a changed underbody clearance.

A disadvantage of these known holding devices is, however, that the lifting or lowering of the arms leads to a change of the weight force sensed on the weighing pad. In particular, either the force is reduced or an additional force is transmitted to the weighing pad via the spring damper system and the wheel. Due to these "fictional forces", the measurement accuracy is reduced or the measurement results of the z-force detection are distorted.

Consequently, there is a need for a holding device of a wind tunnel test stand and a corresponding test method, which allow for increased measurement accuracy and reliability, in particular in the detection of z-forces.

The object is achieved by the invention according to the independent patent claims. Further preferred developments are described by the dependent claims.

One aspect of the invention relates to a holding device for a wind tunnel test stand, wherein the wind tunnel test stand may, in particular, be a wind tunnel balance.

The holding device may comprise a holding base which may be arranged outside of a conveyor belt of the wind tunnel test stand.

Preferably, this should include the positioning of the holding device on one longitudinal side of the conveyor belt outside of the conveyor belt. Particularly preferably, the holding device may be arranged stationary with respect to the continuous belt on a platform or other structure. The platform may preferably hold a belt unit, around the rollers of which the conveyor belt may be wound.

Furthermore, the holding device may include a support element having at least two ends. Preferably, the support element may be a substantially one-dimensional body or comprise such a body wherein substantially one-dimensional means that, compared to the length of the body, all other dimensions are negligible in other directions/dimensions. This is advantageous for the suppression of (larger) disturbances of a fluid flow and distortions of measurement because, in particular, a large diameter or a large width/height of the support element can lead to undesirable distortions.

One end of the support element may be connected to the holding base, so that a (rotational) orientation of the support element relative to the holding device may be variable. Another end, preferably the end arranged opposite in the longitudinal direction, may be connected to a wheel of a test object via a connecting element.

It should be noted that the wording "via a connecting element" should not rule out that other components/elements may be arranged between the wheel and the support element.

The test object may preferably be a motor vehicle, in particular a passenger car or a truck.

The connecting element may preferably be provided to decouple the rotatable (motor vehicle) wheel from the support element or the holding device in the direction of rotation. In other words, a rotation or torsion of the support element should not result in a rotation of the wheel, which may be implemented by the connecting element. The connecting element may preferably be a pivot bearing.

Further, the holding device may include a support device which may be connected to the support element such that a change of the rotational orientation of the support element may cause a lifting or lowering of the support device.

It should be noted here that a rotational orientation may indicate a rotational position of a predetermined point on the support element about the y-axis as a rotation axis. The coordinate system is preferably chosen such that the x-axis points in the direction of travel of a conveyor belt of the test stand or the wind tunnel balance. The y-axis is transverse to the conveyor belt. The z-axis points from the surface of an upper run of the conveyor belt away from the conveyor belt.

In other words, the rotational orientation may indicate a rotational position/twist/torsion of the support element about the y-axis. The rotational orientation of the support element may be varied, in particular, by means of rotation of the support element and/or torsion of the support element.

A lifting or lowering movement preferably means that a z-position of the support device or its free end is changed. The connection of the support device to the support element may thus be such that a rotation and/or torsion of the support element, i.e., a rotational movement, can be converted to a substantially linear movement of (a part of) the support device.

In other words, a torque which can be applied to the support element can be supported through the support device at the test object, preferably a part of the vehicle body, by means of the support element.

The connection between one end of the support element and the holding base may preferably be implemented by means of a pivot bearing. In other words, the support element may preferably be supported at the holding base such that the support element has a rotational degree of freedom relative to the holding base (around the y-axis) while the other rotational and translational degrees of freedom may be suppressed. However, it is further also possible that, for example, another degree of freedom may be available. Particularly preferably, also a translational degree of freedom along the y-axis can be present in addition to the rotational degree of freedom about the y-axis, so that the support element can be aligned in the y-direction with respect to the holding base.

The fixation of the test object on/above the conveyor belt is also regularly referred to as a "restraint".

The holding device allows the vertical force generated by a torque (at the support element) to produce a counter force of the same magnitude in the opposite direction. Because of these two forces of equal magnitude and opposite direction, the so-called contact force on the weighing pad is not influenced or distorted despite introduction of force into the test object. In other words, the height of the test object above the conveyor belt, in particular the underbody clearance, may be changed without the occurrence of measurement errors in the force measurement at the weighing pads.

The rotational orientation of the support element may be changed by means of a torque. The torque may be manually and/or mechanically generatable/changeable. The support element can be twisted and/or rotated by the torque. The automatic change of the rotational orientation has the technical advantage that, inter alia, a computer-aided control is enabled, which may allow a computer-controlled change of the rotational orientation. The implementation of the manual change entails very little structural complexity. A combination makes it possible to perform a desired adjustment/change even in case of a failure of the automatic control, for example.

The holding base may include an orienting device for mechanically changing the rotational orientation of the support element. It may comprise a torque motor which may be arranged at the holding base and may transmit a rotation/torque to the support element. Furthermore, a lever element may be connected (in a rotationally locked manner) to the support element, wherein the lever element may be moved by a laterally offset actuator such that, in particular, a movement of the lever can result in a rotation (twist) of the support element.

Preferably, the support element may be a shaft, particularly preferably a torsion shaft or a torsion spring.

Furthermore, the support device may comprise a lever arm element which at one end can be arranged (in a rotationally locked manner) with the support element and may have a vehicle receptacle at another (free) end thereof.

The lever arm may, for example, be arranged at an angle of preferably 90° with respect to the longitudinal axis of the support element and have the vehicle receptacle at its free end. The receptacle may, for example, be a plate-like element which may be detachably or fixedly connected to the lever arm element and preferably is at an angle of 90° with respect to a longitudinal axis of the lever arm element. Other angles are also possible, for example, a more acute or more obtuse angle. The preferably plate-like element may be disposed below a body of a motor vehicle in order to lift or lower it. The vehicle receptacle may also have certain adapter elements or the like in order to be able to be releasably connected to the body or the like, for example. Thus, the use of a lever arm element is a possibility of little structural complexity for safely and reliably lifting and lowering the test object.

The support device may comprise a toothed rack, the teeth of which may engage with a pinion gear which may be (fixedly) connected to the support element. Thus, a rotation may be converted into a linear movement of a lever or support element which may be connected to the test object. For example, the vehicle receptacle may be connected to the toothed rack. The pinion may be introduced/formed directly into the support element to allow a material-efficient design.

Furthermore, the support device may comprise a cable, one end of which may be connected to the support element and the other end of which may be able to be arranged at a portion of the test object or a vehicle receptacle. In particular, the term cable should include a flexible, essentially one-dimensional element (with two ends) which may also exhibit elasticity in the longitudinal direction. At one end, the cable may be fixedly connected to the support element, so that the cable may be either wound up or unwound when the support element is rotated/twisted. The unwinding or winding up may allow a change in the underbody clearance of the test object involving low structural complexity. In case of a supporting device with a cable, the vehicle receptacle preferably includes a clamping or engaging portion that can firmly grip a part of the wheel house, for example, so that a pulling force can be directed to the test object by means of the cable.

The support device may comprise a double lever arm, wherein a first arm may be connected to the support element in a rotationally locked manner, a free end of a second lever arm/connecting rod may be connected to the test object, and the first and second lever arms of a joint may be connected with each other. This possibility saves, inter alia, more space than adopting a rigid lever arm element.

Furthermore, the support element may be implemented in a telescopic manner, so that, in addition to a corresponding mounting of the support element at the holding base, an additional or alternative way of positioning the support element in y-direction may be provided.

The rotational orientation of the support element may be changed manually by means of a torque wrench, wherein one end of the support element may have an adapter for receiving the torque wrench. The adapter may be integrally formed in the end of the support element or may be mounted thereon.

Furthermore, an aspect may comprise a wind tunnel test stand which includes at least one holding device described above for each motor vehicle wheel, at least one belt unit with a conveyor belt that may be wound around two rollers, and at least one weighing pad located below the conveyor belt for each motor vehicle wheel. The holding base may optionally be mounted on a platform on which the belt unit may be arranged. Further optionally, the platform may be supported rotatably about a z-direction.

Furthermore, two holding devices, which may each be associated with a motor vehicle wheel, may be arranged on each side of a test object, respectively. A cross connection element may be arranged between the two support elements of two adjacent holding devices. The cross connection element allows the increase of the rigidity of a composite of two holding devices, so that the test object may be reliably held in the predetermined position. Preferably, the cross connection element may be arranged such that it can connect one end of a support element with a free end of the other support element located opposite in the longitudinal direction. Most preferably, the cross connection element is arranged obliquely with respect to the x-axis in plan view, i.e., it has a slope along a flow direction of the fluid flow. The slope may be positive or negative, where positive means that the front end of the cross connection element in x-direction is arranged closer to a test object in y-direction than the rear end. Particularly preferably, the cross connection element may be much longer than it is wide and high, i.e., it is preferably essentially one-dimensional.

Furthermore, an aspect comprises a method for testing a motor vehicle. This vehicle may optionally be fixed on/above a conveyor belt of a wind tunnel test stand by means of a holding device described above. The method may alternatively be carried out with a different holding device, e.g., a previously known one. A reference plane/zero plane of the x-, y-, z-coordinate system may be arranged on a surface of the conveyor belt. The method may comprise the following steps (in the following order or in a different order): generating a fluid flow flowing in a longitudinal direction of the conveyor belt. Calculating a restraint disturbance quantity. Offsetting the restraint disturbance quantity against measured values of the testing method. Incidentally, the method described in this application may be carried out analogously for a restraint disturbance quantity generated by a holding device which does not use a torque for changing the vertical position of the vehicle; Thus, the method may, for example, also be used with a (previously known/conventional) holding device which is moved linearly to change the vertical position of the motor vehicle.

Further, the restraint disturbance quantity may be computed from $$\Sigma = \frac{F_x z_{wheel\ hub}}{x_{wheelbase}},$$

where $F_x$ may correspond to a force generated by the fluid flow, $z_{wheel\ hub}$ may correspond to a distance between the reference plane and the wheel hub of the test object, and $x_{wheelbase}$ may correspond to a wheelbase of the test object.

The restraint disturbance quantity may be computationally added to a measured weight of a rear axle of the test object, when the test object is held by means of a holding device for each vehicle wheel and a cross connection element is arranged between two adjacent holding devices such that a longitudinal axis of the cross connection element has a positive slope in a direction transverse to the direction of the fluid flow.

The restraint disturbance quantity can be computationally subtracted from a measured weight force of a front axle of the test object, when the test object is held by means of a holding device for each vehicle wheel and a cross connection element is arranged between two adjacent holding devices such that a longitudinal axis of the cross connection element has a negative slope in a direction transverse to the direction of the fluid flow.

The method thus makes it possible to computationally eliminate measurement distortions caused by wind and restraining forces from the measured values of the weighing pads so that the accuracy of the test can be further increased.

In summary, the presented aspects have the advantage that a test of a motor vehicle can be performed with increased accuracy, even when the vehicle is adjusted/varied with respect to its underbody clearance during testing.

Figure 2:
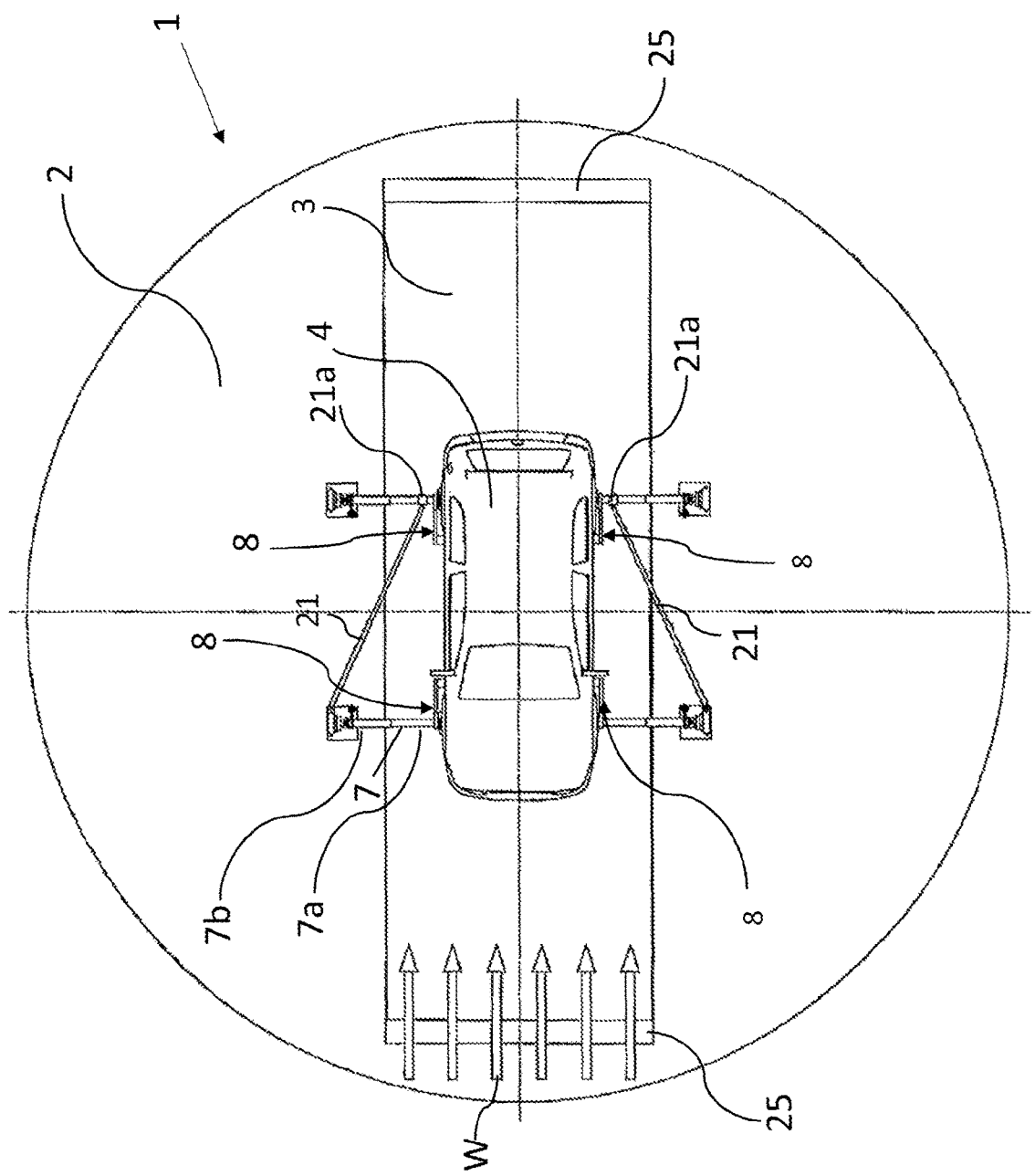

The device set forth herein and the associated method are described below by way of example with reference to the accompanying schematic drawings. In the figures:

FIG. 1 is a plan view of a plurality of holding devices and a wind tunnel test stand, FIG. 2 is a further plan view of a plurality of holding devices and a wind tunnel test stand, FIGS. 3a-3c show different examples for a support device of the holding device described herein, FIGS. 4a-4b show further examples of support devices for holding devices described herein, and FIGS. 5a-5c show examples of holding devices described herein.

In the following, various examples are described in detail and with reference to the figures. Herein, same or similar elements in the figures are designated with the same reference numerals. The present device and method are not limited to the disclosed combinations of features. Rather, other modifications and combinations of features of different examples are intended to be encompassed within the scope of the independent claims.

In FIG. 1, a test system, in particular a part of a wind tunnel test stand 1, is shown in plan view. The arrows drawn on the left side from left to right represent a fluid flow F, which is used to examine or test the aerodynamic properties of the test object or motor vehicle 4.

The coordinate system drawn in FIG. 1 has its zero point on an upper surface of the conveyor belt 3 of the wind tunnel test stand 1, wherein the X-direction points in the direction of travel of the conveyor belt 3, the Y-direction is arranged along the transverse direction of the conveyor belt 3, and the Z-direction protrudes out of the surface of the conveyor belt 3.

The wind tunnel test stand 1 is, in particular, connected to a platform 2 which may be rotated with respect to the fluid flow direction, i.e., is mounted rotatably about the Z-axis. In the platform 2, a belt unit with a single conveyor belt 3 is embedded, wherein a plurality of belt units and/or a plurality of conveyor belts 3 may also be embedded in the platform 2. Furthermore, the conveyor belt 3 shown in FIG. 1 may be divided into a plurality of individual belts.

The test object 4 is arranged on the surface of the conveyor belt 3 and is held in position by four of the holding devices 5, 6 described herein. In detail, the holding devices each comprise a holding base 5a, 6a shown in FIG. 1, on which a support element 7 is arranged. The four support elements 7 of the holding devices 5, 6 shown hold the vehicle on the conveyor belt 3 in position. Preferably, the vehicle is positioned centrally in Y direction with respect to the conveyor belt 3 and centrally in X-direction between the rollers 25 belonging to the belt unit. FIG. 1 shows a cross connection element 21 between each two adjacent holding devices 5, 6. Viewed from front to back, the cross connection elements 21 extend obliquely in X direction. The cross connection elements 21 increase the rigidity of a composite formed from two adjacent holding devices 5, 6, respectively.

FIG. 2 also shows a wind tunnel test stand 1 in plan view. Here, the cross connection elements 21 are, as an alternative to the arrangement in FIG. 1, fixed extending in X-direction from front to back obliquely towards the vehicle. The cross connection elements 21 may, for example, be disposed with screw connections to the holding base 5a, 6a and may be fastened to the support element 7a, for example, using an annular collar 21a. Other fastening configurations are not excluded.

Furthermore, FIGS. 1 and 2 also show other components of the holding devices 5, 6, in particular support devices 8. The support devices 8 are each arranged at the end 7a of the support element 7 which is arranged opposite to the end 7b connected to the holding base 5a, 6a. In other words, the end 7a is the end located closer to the test object 4. Examples of various support devices 8 are shown in FIGS. 3 and 4, which are described below.

FIGS. 3 and 4 each show a vehicle wheel 22 which is supported on a balance or a weighing pad 10. The weighing pad 10 is drawn to be visible in the figure for the sake of clarity, although it is located under the conveyor belt 3. The measurement through the conveyor belt 3 is usually referred to as a through-band measurement.

The weighing pad 10 allows sensing vertical forces, i.e., Z-forces or Z-components of forces, through the belt 3, wherein a fluidic sliding surface is arranged above the weighing pads 10 on the surface thereof. The fluidic sliding surface is generated by a thin air film which is disposed between a lower surface of the conveyor belt 3 and a surface of the weighing pad 10. This fluidic sliding surface, which is not shown, makes it possible that no significant frictional forces arise between the conveyor belt 3 and the weighing pad 10 when the conveyor belt 3 rolls above the weighing pad 10 or is moved thereover.

The examples shown in FIGS. 3 and 4 have further in common that a connecting element 13, which is configured as a pivot bearing in the four described figures, is arranged at the end of the support element 7. In particular, this pivot bearing connects a wheel hub of the wheel 22 with the outer end 7a of the support element 7, so that substantially no rotation is transmitted from the wheel 22 to the support element 7 or vice versa in the rotation direction arranged in Y-direction Other forces, in particular those for holding the motor vehicle wheel 22 or the associated test object 4 in position, are transmitted, however, and these are, in particular, translational forces in the X-, Y-, and Z-directions.

In particular, FIG. 3a shows an example in which the support element 7 is a torsion spring 7'. The torsion spring 7' is twisted because of an introduced torque, resulting in a rotational position change (of the support element 7). Furthermore, FIG. 3a shows that a lever arm element 8a is arranged at an end portion of the torsion spring 7' in a rotationally locked manner. This lever arm element 8a has a length which is at least larger than a radius of the motor vehicle wheel 22, and very particularly preferably greater than a radius of a wheel housing 11 of the test object 4. As FIG. 3 shows, the lever arm element 8 is fastened in a cross-sectionally tapered section of the torsion spring 7' and is protruding from the torsion spring 7' at an angle of 90° with respect to the longitudinal axis thereof. Similarly, a plate-shaped element 8b, which is formed integrally with the lever arm element 8a, protrudes at an angle of 90° with respect to the longitudinal axis of the lever arm element 8a. This plate-shaped element 8b acts as a vehicle receptacle 8c, which extends below a body of the test object 4 in order to transmit a lifting and/or lowering movement of the support device 8 to the test object 4.

Specifically, a torsion of the torsion spring 7' is converted into a vertical lifting or lowering force via the lever arm element 8a and the vehicle receptacle 8c and directed to the test object 4. An advantage of this design is that, simultaneously with the vertical force transmitted to the test object 4, an opposing force with the same magnitude is transmitted to the weighing pad 10. Thus, a balancing of the force required for lifting or lowering the vehicle takes place and no measurement distortion does occurs.

In FIG. 3b, by way of example a torsion shaft 7" is used as a support element 7 instead of a torsion spring 7'. The remaining set-up corresponds to that of FIG. 3a. Furthermore, FIG. 3c shows an example in which a connecting rod 9 of a double lever arm construction is articulatedly connected to the lever arm element 8. Moreover, the connecting rod 9 is articulatedly connected to a vehicle receptacle 8c shown as a body adapter 23. The body adapter 23 is configured such that it can reach around the outer diameter of the wheel 22 and reach below an upper portion of the vehicle wheel house 11. The body adapter 23 has a radius 23a which is preferably equal to or greater than an outer edge radius 22a of the vehicle tire 22.

The double lever arm joint connects the connecting rod 9 and the lever arm element 8, which is fixedly connected to the support element 7, so that a rotational or torsional movement of the support element 7 can be converted into a lifting and/or lowering movement of the vehicle support 8c/23.

Furthermore, FIG. 4a shows an example, in which the support device 8 comprises a cable 8d, the tensile force of which is proportional to the torque introduced into the support element 7. If the cable 8d is unwound by a rotary movement of the support element 7, the test object 4 raises due to the fixed connection between the vehicle receptacle 23 and the cable 8d and due to the resilience of a suspension. Lowering is achieved by winding up the cable 8d on the support element 7. The vehicle receptacle 8c shown is preferably shaped like the vehicle receptacle of the example of FIG. 3c already described. In addition, the vehicle receptacle 23 may have a bore for fastening the cable 8c and a clamping or engaging means, which can be fixedly connected to the body of the test object 4 in a releasable manner.

Further, FIG. 4b shows that the support element 7 has a gear wheel or pinion 12 has at an outer end portion that meshes with an opposing toothed rack 24. The toothed rack 24 is configured such that it comprises a lever arm element 8a or connected thereto, and the lever arm element 8a has an opening at an end portion 24a making it possible to grip around the support element 7. The lever arm element 8a, which is shown by way of example formed integrally with the toothed rack 24, has a vehicle receptacle 23 for contacting the vehicle body at one other free end. The twisting and rotating of the support element 7 results, due to the meshing between the pinion 12 and the toothed rack 24, to a conversion from a rotational movement into a translational movement which can be used for lowering or lifting the motor vehicle/test object 4.

Additionally, the three individual segments of FIG. 5 show different examples, in particular with respect to the configuration of the rotation mechanism or of an introduction mechanism of a torque into the support element 7. In a manual embodiment according to FIG. 5b, the support element 7 or a portion of the holding base 5a, 6a includes a tool adapter 14 connectable to a tool 17, which preferably is a torque wrench. Thus, a torque can be introduced into the support element 7 by means of the torque wrench 17, for example leading to the torsion of the torsion spring 7'. The torque is varied until the position of the body in the Z direction corresponds to the desired position. Subsequently, the rotational orientation of the support element 7 with respect to the holding base 5a, 6a is locked. For this purpose, for example, positive or non-positive means can be arranged at holding base 5a, 6a and support element 7, respectively. For example, a clamping mechanism and/or an engagement mechanism may be provided which fixes the supporting element 7 in an adjusted rotational orientation position by clamping and/or locking it.

Furthermore, FIG. 5c illustrates an embodiment, wherein torque motors 18 introduce a torque or rotation into the support element Tin an automated or preferably computer-controlled manner. Alternatively, FIG. 5a shows that an actuator 15 is extended and retracted in Z direction in order to introduce a torque into the support element 7 or a rotation into the support element 7 via a lever 16. For this purpose, one end of the lever 16 may be connected to the support element 7 in a rotationally locked manner. For example, this may be implemented by a spring-groove connection or a clamp collar 19.

Furthermore, from FIGS. 5a to 5c it can also be seen that the support devices 8 at the front and rear holding devices 5, 6 are oriented in opposite directions with respect to each other, wherein this is an example only and another orientation would also be possible.

In summary, no translational forces are transmitted in the herein described holding device 5, 6 from the fixed part/holding base 5a, 6a to the test object 4, but torques are introduced into the support element 7. The torque generated in the region of the holding base 5a, 6a is converted into a vertical force, or at least a force that having the largest possible vertical component, at the test object 4 by means of a supporting device 8. This results in the technical advantage that the force generated by the support device 8 generates a counter-force of the same magnitude, thus ensuring that the measurement result of the weighing pad 10 is not influenced or a measurement error does not occur. As already explained above, the torque can be generated in different ways and in particular manually and/or mechanically.

With respect to the thin torsion shafts or springs, which should receive no or only a small fluid flow force $F_x$, the rigidity and safety of the fixation by means of the cross connection elements 21 can be improved. When using a torsion spring 7', it should be noted (in particular, if a locking mechanism on the holding base 5a, 6a is used for locking the torsion or rotational orientation), that the torsion spring 7' of the vehicle spring of the wheel suspension is connected in parallel, so that the vehicle spring becomes harder. If this is considered disadvantageous in possible application scenarios, it can be compensated for by the device described herein, for example, by using the torque motor 21 described above for applying the torque. The torque motor 21 has the technical advantage that the torque does not change with the rotational angle. Thereby, the Z-position or Z-location of the test object 4 varies via the force exerted on the vehicle, while the tire spring rate or vehicle spring hardness remains unaffected.

The explanations presented in relation to the torque motor 21 apply equally to the use of a linear actuator in which, for example, constant pressure is applied to a cylinder in order to move the actuator linearly (see FIG. 5a).

Furthermore, the invention described herein also includes a method for testing motor vehicles with wind tunnel test stands 1, in particular wind tunnel cars. For this, at least three forces $F_x$, $F_y$, $F_z$ and three torques $M_x$, $M_y$, $M_z$ are detected. The reference plane for detection of these forces is usually the upper surface of the conveyor belt 3, in particular the tire contact patch 22. Due to restraining the test object 4 at its hub, as shown, for example, in FIG. 3, an application point of a wind force $F_x$ is not in the reference plane. This creates a (torque) lever arm, which generates a disturbance torque. In order to avoid, that this disturbance torque influences the test results, making them more inaccurate, the method described herein makes provisions for computationally eliminating this disturbance torque or restraint disturbance quantity $\Sigma$. For this purpose, first the fluid flow torque is calculated, for which $F_x$ is multiplied by the distance between the surface of the conveyor belt and the wheel centre/hub. Furthermore, restraint disturbance quantity $\Sigma$ is calculated by dividing the fluid flow torque by the wheelbase of the test object 4. The corresponding equation is:

$$\Sigma = \frac{F_x z_{wheel\ hub}}{X_{wheelbase}}.$$

The resultant restraint disturbance quantity/force $\Sigma$ is subtracted from the rear axle weight detected at the weighing pads 10, when a configuration as shown in FIG. 1 is used.

In one configuration of the restraint according to FIG. 2, the calculated quantity $\Sigma$ is added to the weight of the front axle. Such an approach allows the increase of the testing accuracy and reliability by sensing restraint-related disturbance quantities or forces and compensating for them computationally.

In summary, the device described herein and the associated method provide for a substantial improvement in the accuracy of measurement of wind tunnel test stands.

The invention claimed is:

1. A holding device for a wind tunnel test stand including a wind tunnel balance, the holding device comprising: a holding base which is arranged outside a conveyor belt of the wind tunnel test stand; a support element having at least two ends, wherein one end is connected to the holding base and another end is connected to a wheel of a test object by means of a connecting element, and wherein the connecting element decouples the support element and the wheel from one another in a rotational direction; and a support device, which is connected to the support element such that a change in a rotational orientation of the support element causes a lifting or lowering movement of the support device, wherein the rotational orientation of the support element indicates a rotational position of a predetermined point on the support element about a rotation axis transverse to the conveyor belt.

2. The holding device of claim 1 wherein the support element is connected to the holding base in such a way that the rotational orientation of the support element relative to the holding base is variable, wherein the rotational orientation of the support element is changed by means of a torque and the torque is generatable/changeable manually and/or mechanically.

3. The holding device of claim 1 wherein the holding base comprises an orienting device configured to mechanically change the rotational orientation of the support element and the orienting device comprises a torque motor or a lifting element operated by means of an actuator.

4. The holding device of claim 1 wherein the support element is a shaft comprising a torsion shaft or a torsion spring.

5. The holding device of claim 1 wherein the support device comprises a lever arm element which is arranged with the support element at one end and which has a vehicle receptacle at another end.

6. The holding device of claim 1 wherein the support element is connected to a pinion gear, and the pinion engages with a toothed rack which is connected to the support device.

7. The holding device of claim 1 wherein the support device includes a cable, one end of which is connected to the support element and the other end of which is arranged on a portion of the test object.

8. The holding device of claim 1 wherein the support device includes a double lever arm, wherein a first lever arm is connected to the support element in a rotationally locked manner, a free end of a second lever arm is connected to the test object, and the first and the second lever arms are connected to one another by means of a joint.

9. The holding device of claim 1 wherein the support element is configured to be telescopic.

10. The holding device of claim 1 wherein the rotational orientation of the support element is changed manually by means of a torque wrench, one end of the support element having an adapter configured to receive the torque wrench.

11. A wind tunnel test stand comprising:
at least one holding device including:
a holding base which is arranged outside a conveyor belt of the wind tunnel test stand,
a support element having at least two ends, wherein one end is connected to the holding base and another end is connected to a wheel of a test object by means of a connecting element, and wherein the connecting element decouples the support element and the wheel from one another in a rotational direction, and
a support device, which is connected to the support element such that a change in a rotational orientation of the support element causes a lifting or lowering movement of the support device, wherein the rotational orientation of the support element indicates a rotational position of a predetermined point on the support element about a rotation axis transverse to the conveyor belt;
at least one belt unit with a conveyor belt wound around two rollers; and
at least one weighing pad for each motor vehicle wheel, which is arranged below the conveyor belt, wherein the holding base is fixed on a platform on which the belt unit is arranged, and the platform is rotatable about a z-direction.

12. The wind tunnel test stand of claim 11 wherein two holding devices, which are each assigned to a motor vehicle wheel, are arranged on each side of a test object, and wherein:
a cross connection element is arranged between the two support elements of two adjacent holding devices so that it connects one end of a support element to a longitudinally opposite other free end of the other support element.

13. A method for testing a motor vehicle, the method comprising:
fixing the motor vehicle above a conveyor belt of a wind tunnel stand using a holding device, a reference plane being arranged on a surface of the conveyor belt, and the holding device comprising:
a holding base which is arranged outside a conveyor belt of the wind tunnel test stand,
a support element having at least two ends, wherein one end is connected to the holding base and another end is connected to a wheel of a test object by means of a connecting element, and wherein the connecting element decouples the support element and the wheel from one another in a rotational direction, and
a support device, which is connected to the support element such that a change in a rotational orientation of the support element causes a lifting or lowering movement of the support device, wherein the rotational orientation of the support element indicates a rotational position of a predetermined point on the support element about a rotation axis transverse to the conveyor belt;
generating a fluid flow flowing in a longitudinal direction of the conveyor belt;
calculating a restraint disturbance quantity $\Sigma$; and
offsetting the restraint disturbance quantity $\Sigma$ against measured values.

14. The method of claim 13 wherein the restraint disturbance quantity $\Sigma$ results from $$\Sigma = \frac{F_x z_{wheel\ hub}}{X_{wheelbase}},$$

where $F_x$ corresponds to a force generated by the fluid flow, $z_{wheel\ hub}$ corresponds to a distance between the reference plane and the wheel hub of the test object and $X_{wheelbase}$ corresponds to a wheelbase of the test object.

15. The method of claim 13 wherein:
the restraint disturbance quantity $\Sigma$ is computationally added to a measured weight force of a rear axle of the test object when the test object is held by means of one holding device per motor vehicle wheel and a cross connection element is arranged between two adjacent holding devices in such a way that a longitudinal axis of the cross connection element has a positive slope in a transverse direction with respect to the fluid flow direction; or
the restraint disturbance quantity $\Sigma$ is computationally subtracted from a measured weight force of a front axle of the test object when the test object is held by means of one holding device per motor vehicle wheel and a cross connection element is arranged between two adjacent holding devices in such a way that a longitudinal axis of the cross connection element has a negative slope in a transverse direction with respect to the fluid flow direction.

* * * * *